Patented Aug. 31, 1937

2,091,304

UNITED STATES PATENT OFFICE 2,091,304

WELDED ARTICLE OF HIGH COPPER ALLOY

Homer W. Butterbaugh, Kenosha, Wis., assignor to The American Brass Company, Waterbury, Conn., a corporation of Connecticut No Drawing. Application July 23, 1935, Serial No. 32,727

3 Claims. (Cl. 75—155)

This invention relates to a welded article or structure made of high copper alloys and has for an object to produce such an article or structure of an alloy which may be readily worked and is particularly adapted for welding, so that it may be used for making regular or irregular shapes, such as extruded, rolled or drawn shaped members, moldings, etc., for architectural work and the like, and various other members for welded structures such as refrigerator evaporators, automobile horns, etc., and the members may be readily welded together to produce strong, rigid structures having dense strong welds which are of substantially the strength and composition of the base metal of the members welded.

It is common to use alloys such as brass for various fabricated structures such as moldings, window frames, and similar shapes for architectural and other purposes and at the joints they are ordinarily connected by soldering with a silver or similar solder, or riveted, as it has been impossible to make satisfactory welds with these brass shapes or members. Welded joints are much more desirable than the soldered or riveted joints as they are more sightly as giving the effect of a unitary one-piece structure, and are stronger and more satisfactory than the soldered or riveted joints.

It is therefore an object of this invention to produce a welded article or structure of an alloy which can be readily worked, as rolled either hot or cold, extruded or drawn into the desired shaped members and can be readily welded at the joints to do away with the necessity of soldering or riveting and to produce much better, more sightly and stronger joints.

I have found that a copper-manganese-zinc alloy comprising approximately 75 to 86% copper, .01% to 5% manganese and balance zinc has very good welding properties, that the welds can be easily made, are dense and homogeneous, and when ground off and polished the weld is practically indistinguishable from the remainder of the base metal. The manganese greatly improves the welding properties and inhibits or suppresses the volatilization of the zinc during the welding operation so that the metal of the finished weld is of substantially the same composition as the base metal of the welded members. The weld therefore has practically the same appearance and is indistinguishable from the base metal, and the strength of the weld is practically the same as the base metal of the elements welded.

The preferred alloy comprises in the neighborhood of 84% copper, 15% zinc and 1% manganese, and I have found an alloy with approximately this composition is very satisfactory for the purposes noted, as members shaped from this alloy can be readily welded together and that the welds are strong, dense and uniform. I have also found that this alloy can be readily worked and readily rolled, extruded, or drawn into irregular and regular shaped members. The material can be used for various structures as architectural structures, such for example as door fronts, building fronts, window frames, and similar work, and also for a large number of other fabricated structures such for example as refrigerator evaporators for which welded structures are practically a necessity for satisfactory structures, for automobile horns, and similar uses where it is desired that the joints be made by welding and especially autogenous welding. By autogenous welding I mean welding where the metal of the welded joint is of substantially the same composition as the base metal being welded, and whether the weld is made by adding weld metal to the joint, as from a welding or filler rod, or by heating and pressing the elements together, as for example in spot welding.

I have found that this copper-manganese-zinc alloy has greatly improved welding properties over the ordinary brasses. As the weld is of substantially the same composition as the base metal it has a tensile strength almost equal to that of the base metal. The weld is also very sound and homogeneous and the metal welds readily so that the joints can be easily and readily made. As above suggested the manganese inhibits the volatilization of the zinc in the base metal during the welding operation so that the composition of the weld is substantially the same as that of the base metal. This also reduces the clouds of smoke or vapors so as not to choke the welder during the welding operation. If it were not for the manganese the loss of zinc would be very high especially in making autogenous welds, thus changing materially the composition of the finished weld. With the present alloy after the weld has been made, ground and polished it is practically impossible to detect it.

It is also particularly pointed out that the manganese reduces the porosity of the metal and therefore increases its strength, giving strong dense welds.

Although an alloy having approximately the above noted proportions has proven very satisfactory for the purposes noted I am not limited to this specific alloy as the portions of the various metals may be varied without destroying its adaptability for producing improved strong, dense welds. However, the amount of manganese is preferably between about 0.25% and 1.5% although it may vary from about 0.01% to about 5%. The copper is preferably from about 80 to 85% but may be from about 75 to 86%. With the higher percentages of manganese the alloy may not work quite as readily in the mill.

This alloy is also very adaptable for use as a welding or filler rod for welding other metals as well as this particular alloy. I also do not wish to exclude from the alloy small amounts of other elements which do not materially affect or destroy its desirable welding properties or its adaptability for the purposes intended.

Having thus set forth the nature of my invention, what I claim is:

1. A welded article composed of alloy consisting of 75% to 86% copper, 0.01% to 5% manganese, and balance zinc, said alloy being characterized by being workable hot and cold and capable of being readily welded and of forming by autogenous welding dense homogeneous welds characterized by the metal of the weld being of substantially the same composition and strength as that of the base metal, and parts of said article being connected by an autogenous weld.

2. A welded article composed of alloy consisting of 80% to 85% copper, 0.25% to 1.5% manganese and balance zinc, said alloy being characterized by being readily workable hot and cold and capable of being readily welded and of forming by autogenous welding dense homogeneous welds characterized by the metal of the weld being of substantially the same composition and strength as that of the base metal, and parts of said article being connected by an autogenous weld.

3. A welded article composed of alloy consisting of approximately 84% copper, 15% zinc and 1% manganese, said alloy being characterized by being readily workable hot and cold and capable of being readily welded and of forming by autogenous welding dense homogeneous welds characterized by the metal of the weld being of substantially the same composition and strength as that of the base metal, and parts of said article being connected by an autogenous weld.

HOMER W. BUTTERBAUGH.